United States Patent [19]
Hintze

[11] 3,817,164
[45] June 18, 1974

[54] GRILL DEVICE
[76] Inventor: Rainer Hintze, D 8443 Bogen/Donau, Germany
[22] Filed: Mar. 28, 1973
[21] Appl. No.: 345,749

[30] Foreign Application Priority Data
  Mar. 30, 1972 Germany............................ 2215810

[52] U.S. Cl............................. 99/421 V, 99/421 M
[51] Int. Cl. ............................................. A47j 37/04
[58] Field of Search.......... 99/421 V, 421 M, 421 P, 99/25 R, 25 A, 9 R, 25 AA

[56] References Cited
UNITED STATES PATENTS
175,050  3/1876  Dejey ..................... 99/421 M
2,985,096  5/1961  Wolske............................. 99/421 P FOREIGN PATENTS OR APPLICATIONS
1,099,294  9/1955  France ............................. 99/421 M
618,482  3/1927  France ............................. 99/421 M Primary Examiner—William F. O'Dea
Assistant Examiner—Harold Joyce
Attorney, Agent, or Firm—Hill, Gross, Simpson, Van Santen, Steadman, Chiara & Simpson

[57] ABSTRACT

A cooking grill having at least one vertically standing spit wherein a propeller is arranged about a vertical axis in a position overlying the heating coals adjacent the spit and is drivingly connected to the spit, whereby rising heat from the coals will rotate the propeller and spit and wherein the spit is completely suspended from the propeller to minimize friction losses and permit a free pivoting action between propeller and spit.

10 Claims, 4 Drawing Figures

Fig. 4
Fig. 3
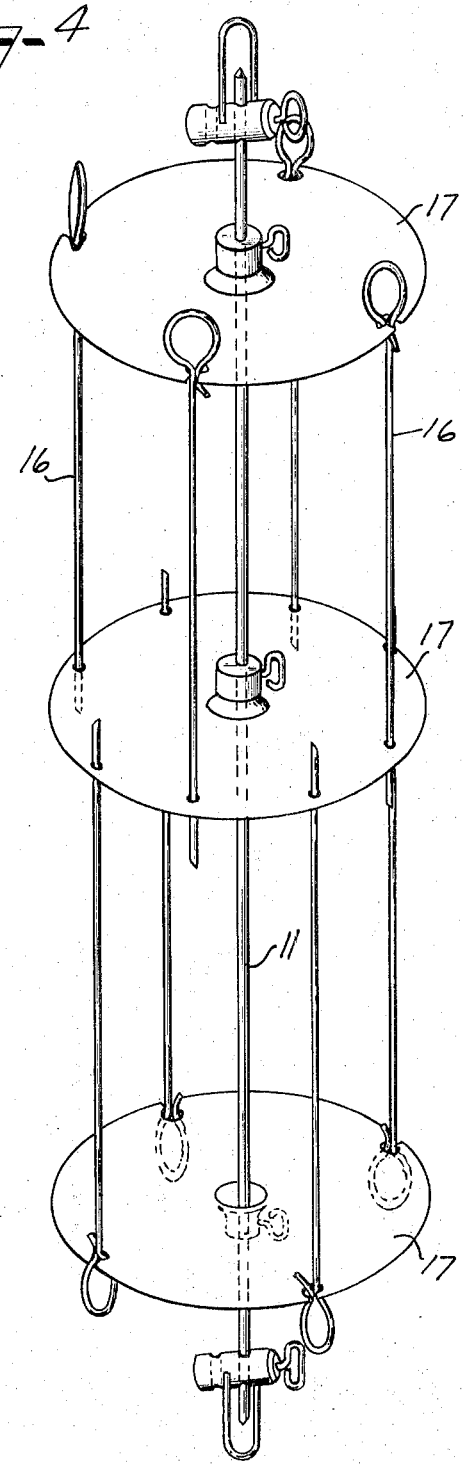
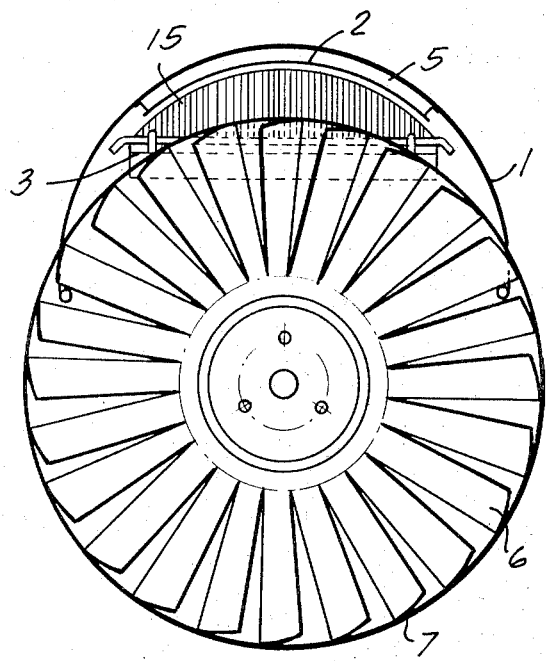

3,817,164

GRILL DEVICE

BACKGROUND OF THE INVENTION

The invention refers to a cooking grill whereby the object to be grilled is arranged on or about an axis placed in rotation, for instance on a spit or on several spits located at a radial distance from the axis and rotating around same and wherein, a source of heating or radiation is located such as, for instance, charcoal and wherein the motor for driving the spit or spits about the axis is itself driven from the hot air created by the heating or radiation source through means of a propeller which is arranged in the hot air stream. Apart from electrically heated grill devices, there are many in which charcoal or the like is used as the heating source. In such cases, the charcoal is located in a special container which may extend in vertical direction and is arranged next to the object which is to be grilled. The object to be grilled is placed on a spit or spits which are placed in rotation manually or in most cases by electrical motors either AC or battery driven. Driving the spit by hand or by spring motors is known for grill devices, however, it is cumbersome for a long continuous operation. Compared thereto a drive by means of an electrical motor is very practical; however, it is dependent on the presence of electrical energy sources which are not always and at any time disposable to a sufficient extent. For instance, the supply of the drive by means of an electrical motor from an auto battery is only possible over a certain period. In addition, it is necessary in the operation from an auto battery to place the grill device in proximity of the car. Electrical operation by means of common dry cell batteries is no doubt very practical; however, in the long run it is very costly because of the battery consumption.

A grill device is known from the French Letters Pat. No. 1,099,294 which stands vertically and is placed in rotation by rising warm air or hot gas via a propeller. The spit is supported at its base with its tip in the bore and is guided above through a further support. However, in this known embodiment there is the danger that the lower support may become clogged by dirt and that thereby the frictional forces increase in this support. In an air driven spit, such frictional losses may be critical. By means of the twofold support of the spit, in addition, the removing of the grilled object is rendered more difficult and a turning of the spit and therewith of the grilled object is either rendered impossible or more difficult. Since furthermore, the grilled object cannot be placed on the grill spit in such a way that the rotation axis of the grilled object which is placed on the spit and of the spit itself coincide there will always be an imbalance which itself again requires correspondingly fluctuating driving forces. Since this is not the case, however, an uneven rotary movement will result in this type of drive; the object to be grilled will only be radiated from one side and an uneven heating of the grilling object will result.

Furthermore, a grill device is described in the French Letters Pat. No. 618,482 whereby the spits are arranged vertically. Each spit is freely suspended at a gear wheel which is supported on two ends. The gear wheels are placed into rotation via an interim wheel by a propeller driven by hot air. Even though the spit is freely suspended the gears should show such large friction losses that the forces of the propeller may not be sufficient to keep the gears in motion unless the heat power would be utilized predominantly for the drive of the propeller. The fact that grill devices which are driven by means of a propeller were known but could not achieve practical significance confirms the previously mentioned hypothesis.

SUMMARY OF THE INVENTION

The task which is to be solved and on which the invention is based consists in creating a grill device where the deficiencies of the prior art alluded to above can be overcome. According to the invention in a device of the initially described type, the task is solved in such a way that the propeller is arranged with a vertically standing axis and is suspended freely mobile via bearings at a supporting arm and at the lower side of the vertically standing propeller axis. The means for suspending grill object carrier from the propeller axis allows a free two way movement between propeller and carrier so that the propeller as well as the carrier can carry out their own precision rotary movements. The propeller can preferably be arranged in a certain area mobile and shiftable in all directions. The hot air which is required for the drive is created by the heating source of the grill device itself. The air current which is thus formed depends on the combustion condition of the grill and thus results automatically in the correct movement course which entails that the rotation speed increases towards the end of the grilling process.

The grill object carrier is preferably suspended vertically standing at the propeller and is designed in such a way that it can be removed easily. Furthermore, the grill object carrier can be provided at both ends with like suspension devices; therefore, it can be suspended as desired and the turning over of the to be grilled object becomes possible in a simple manner. The grilled object which was located at first above can be placed in the lower position after reversing of the carrier and the grill object which was first arranged below can be placed in the upper position. Thus, a high quality grilling can be achieved. The grill device can be placed in an advantageous manner on the base which can be possibly used for different purposes for instance as a table.

THE DRAWINGS

The invention is explained in more detail by means of the embodiments described in FIGS. 1 to 4.

FIG. 3 is a plan view of the propeller; and

FIG. 4 is a perspective view of a grill carrier constructed in accordance with the present invention.

DESCRIPTION OF THE PREFERRED EMBODIMENT

Figure 1:
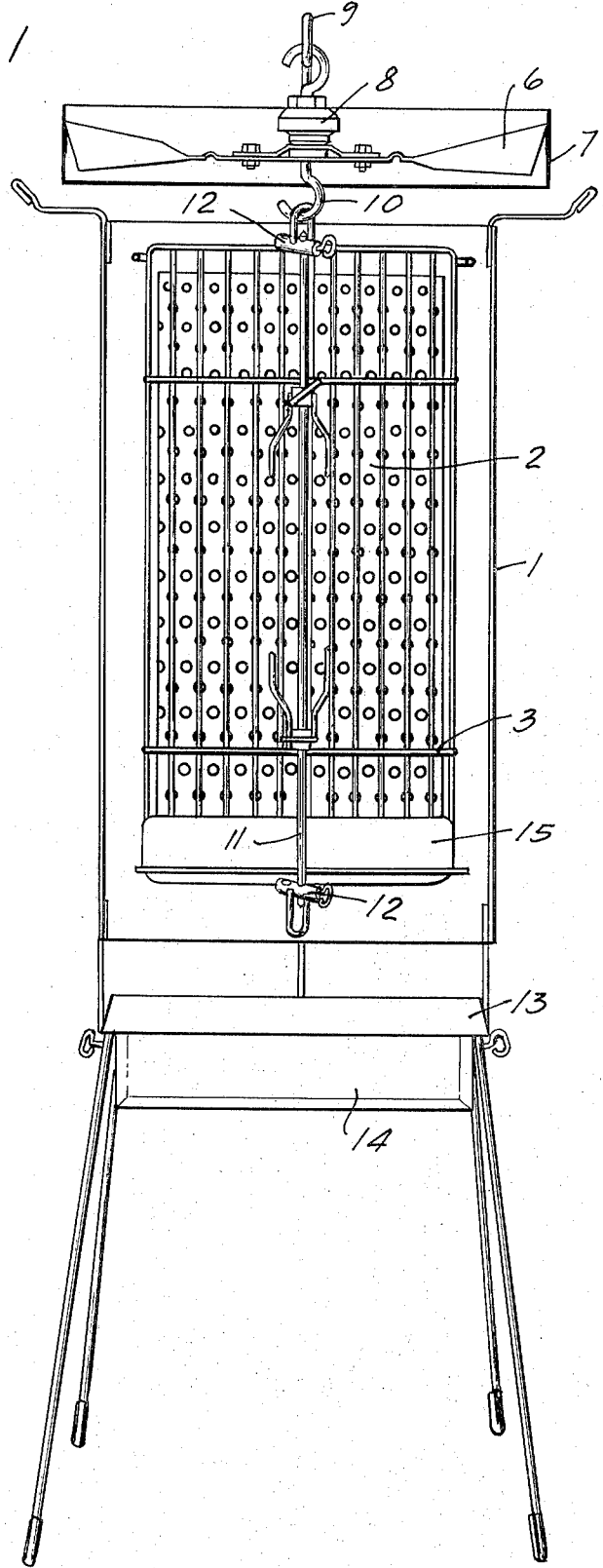
FIG. 1 shows a partially sectioned front view of the grill device.

The grill device consists of an oven jacket 1 and a vertically standing heating part 2. Both are designed semicylindrically whereby the jacket 1 serves as a wind screen for the heating part 2. On the front side of this heating part 2 is disposed a grating 3. An ash container 14 is formed at the base of the jacket 1 beneath the heating part 2. The back wall of the heating part 2 shows, as becomes obvious from FIG. 2 windows 4 in form of holes or slots through which the air circulation takes place from the front side through the grate 3 and the back side via the windows 4 in the semicircular channel which is formed between the oven screen-like jacket 1 and the heating part 2 having the effect of a chimney. The air speed is extraordinarily increased by this chimney effect. Simultaneously, however, the outer jacket 1 is prevented from becoming hot.

The propeller 6 is mounted above the chimney and the interior of the casing in a manner hereafter to be described. The hot air hits the propeller 6 at high speed at its outer circumference whereas the air heated directly by the glowing coals and rising from the front side of the heating element 2 shows a slower speed and flows through the inner part of the propeller. Thus, the hot air with the larger energy content contributes to the movement of the propeller in approximately the same ratio as the amount of air which is larger but shows a smaller energy content. The hot air which flows from the ring-shaped chimney 5 impinges upon the larger radius of the propeller and thus exercises a larger rotary movement. Preferably, the propeller is provided with a ring-shaped sheet metal jacket 7 in order to better utilize the rising hot air. This sheet metal jacket also has the task to render the propeller mechanically more stable and independent of possible side winds. The latter task is of special importance if the device is used outside. The cylinder has the effect of a flettner rotor which in case of side wind causes an increase of the rotary movement rather than a decrease.

The propeller 6 is suspended via a bearing member 8 from a supporting arm 9 in a freely mobile way. The extended axis of the propeller is designed as hook 10 from which the grill object carrier 11 can be suspended. This carrier is preferably designed in such a way that each end can be suspended in the same manner at hook 10 by means of an eye 12.

Figure 2:
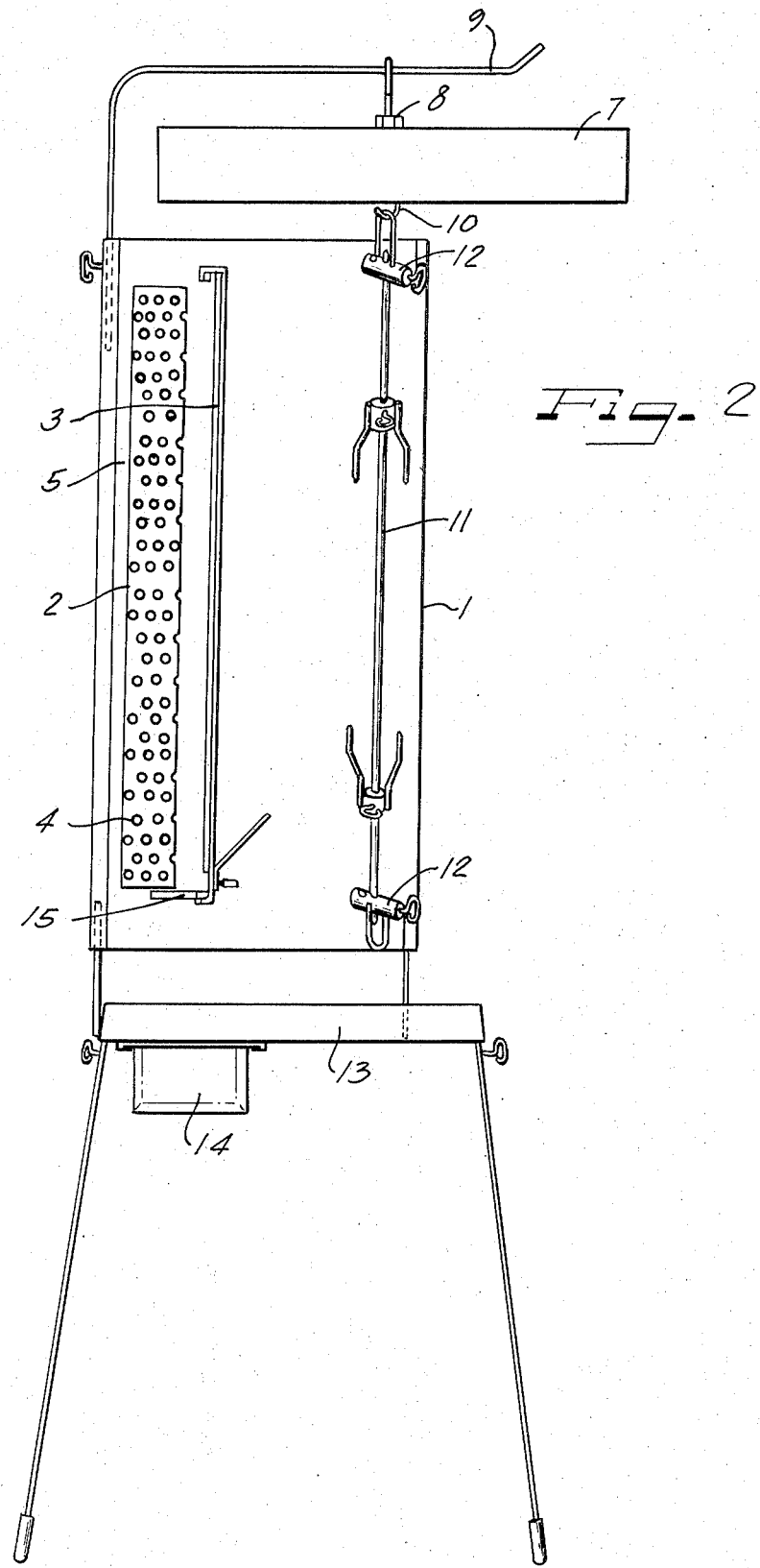
FIG. 2 is a partially sectioned, side elevation view of the device shown in FIG. 1.

The grill object carrier can be designed as simple spits 11 as is illustrated in FIGS. 1 and 2 or may also consist of several spits which are located at a distance from the middle axis and rotate around same. The embodiment shown in FIG. 4 shows the spits 16 which are arranged at the same radial distance from the middle axis 11 in two levels. The spits 16 are attached to the circular disks 17 which are supported on the middle axis 11. The design of the disks makes a practically random composition of spits and disks possible; for instance, only two disks and longer spits can be used. As a middle axis a single spit can be used.

As becomes obvious from FIGS. 1 to 3 the heating part 2 is closed off below by a coal grating 15 which may also be formed integrally with the grating 3. The actual grill device is placed on a base 13 which incorporates an ash box 14 and can simultaneously serve to support grease pans, etc. The grease pans serve for the reception of the juice, etc., escaping from the grilled object.

The possibility for the solving of the task on which the invention is based is to be explained briefly in the following paragraph. The grill object is held by a mobile or shiftable suspension of the propeller in such a way that the grill object carrier can balance any imbalance by a free swinging movement that means the carrier can adjust itself at any time so that a resting neutral axis is created.

The balancing of the imbalance takes place in the double freely mobile suspension namely the propeller at the supporting arm 9 and the grill object carrier at propeller 6. In order to solve the problem to be able to drive the propeller with as little energy as possible all friction, braking and imbalancing forces have been brought to a minimum in the grill device according to the invention.

The propeller 6 can be shifted over the chimney from which the warm air escapes so that a change of the rate of revolutions can be achieved. In addition thereby simultaneously a change of the radiation intensity effective on the grill object is achieved. Thereby the browning and the cooking of the meat can be influenced. The grill object carrier 11 is arranged in such a way that it allows the turning over of the grill object without any difficulties. This step results in the further possibility to grill the grill object evenly since in case of a charcoal grill the intensity of the radiation is in most cases considerably stronger in the lower part.

The drive of the grill objet carrier by a motor driven by hot air is not only completely independent of all outer energy sources but also has an amazing effect on the observer. Since the individual parts of the device can be separated easily and are mechanically insensitive the device can be used in all situations.

For instance, the base 13 can be used as a table if upon removal of the propeller the upper part is brought into a position as an independent unit in which the grating lies horizontal. In this position certain grill objects for instance sausages can also grilled directly over the coals.

I claim as my invention:

1. A cooking grill comprising an upstanding open top wind screen jacket embracing a cooking space, an ash receptacle at the base of the jacket underlying said space, a support member extending from the jacket over the top of the cooking space, an upstanding heating member mounted in the cooking space in spaced relation from the jacket and cooperating therewith to form a chimney discharging to the open top of the jacket, a horizontal propeller rotatably suspended from said support member at the open top of the jacket in overlapping relation with said chimney and shiftable horizontally along said support member to vary the amount of overlap, and a removable carrier suspended from said propeller for corotation therewith and being freely swingable to adjust itself to a neutral rotating axis for balancing any unequal loading of material thereon, whereby heated air rising from said chimney will rotate said propeller and the desired rotation may be controlled by varying the amount of overlap of the propeller with the chimney.

2. The grill of claim 1 wherein the propeller is suspended from the support member for free swinging movement and cooperates with the free swinging carrier to provide a double freely mobile suspension for the propeller and carrier reducing friction, braking and imbalancing forces.

3. The grill of claim 1 wherein the propeller has a hook depending from the axis thereof and the carrier has an eye end receiving said hook.

4. The grill of claim 3 wherein the carrier has eyes at both ends thereof to accommodate suspension of the carrier from either end.

5. The grill of claim 1 wherein the carrier is a spit.

6. The grill of claim 1 wherein the carrier has a central axis surrounded circumferentially by a plurality of spits.

7. The grill of claim 1 wherein the wind screen jacket has an open front along the length thereof and the propeller has a jacket ring therearound.

8. The grill of claim 7 wherein the open front jacket is fragmental cylindrical in shape.

9. The grill of claim 1 wherein the heating member is arcuate in shape and extends from the bottom to the top portions of the jacket.

10. The grill of claim 9 including a vertical grating in front of the heating member.

* * * * *